United States Patent Office 3,378,594
Patented Apr. 16, 1968

3,378,594
HYDRAZINE NITROFORM AND METHOD
OF PREPARATION
John R. Lovett, Edison, N.J., assignor to Esso Research
and Engineering Company, a corporation of Delaware
No Drawing. Filed Aug. 3, 1960, Ser. No. 47,322
10 Claims. (Cl. 260—644)

The present invention relates to hydrazine mononitroform, a new compound, and the preparation thereof for use in rocket propellants.

Considerable effort has been expended in the search for high energy solid oxygen oxidizers that are useful in rocket propellant formulations. To be of practical value these oxidizers should be dense, heat stable and relatively shock insensitive both alone and when mixed with other ingredients, in addition to being sources of large amounts of available oxygen. It has now been found that hydrazine mononitroform has the above-mentioned properties. It was surprising to find that hydrazine mononitroform is thermally stable since most nitroform compounds decompose rapidly at room temperature or below. The novel hydrazine compound shows no signs of decomposition even after aging months at room temperature, and it does not decompose even when heated to 77° C. and kept there for long periods of time, e.g. 40 hours. Some decomposition is evident, however, when it is heated to about 110° C. Moreover it is relatively shock insensitive (12 kg. inch) and its sensitivity is not increased by mixing it with powdered aluminum. This fact is of considerable importance in view of the fact that other equally good oxygen sources have failed to become operational because of their extreme sensitivity in aluminized formulations. The nitroform compound, which can be called hydrazinium nitroformate, may be described by the following formula:

$$NH_2NH_2 \cdot HC(NO_2)_3$$

It has a density of 1.86 and its heat of formation is about —11 K. cal. mol.

Hydrazine mononitroform can be prepared by mixing equimolar amounts of hydrazine (anhydrous or hydrated) and nitroform at about 0° to 50° C. and substantially atmospheric pressure. The reaction commences immediately upon mixing the two reactants in the proper proportions and is usually complete as soon as all of each reactant has been introduced in the reaction zone provided the reaction mixture is rapidly agitated with a stirrer or other mixing means. Longer periods of time, i.e. 5 or 10 minutes, are necessary when the reaction mixture is not well agitated. By using equimolar amounts quantitative yields of product are obtained and little or no purification is necessary.

In a preferred embodiment of the invention, the reaction is effected under ambient conditions for from a few seconds to 2 or 3 minutes in the presence of an inert solvent, such as methanol. The term "inert" is intended to mean that the diluent should not interfere with the reaction in any way, although it may catalyse it if it has the capacity to do so. Upon completion of the reaction, the reaction mixture is poured into an excess of a nonsolvent, such as carbon tetrachloride or hexane, and the yellow precipitate which forms is recovered by filtration, or other methods, and washed with additional carbon tetrachloride before it is dried. Other organic solvents which may be used in this embodiment are $C_1$ to $C_{16}$ straight and branched chain (oxo) aliphatic monohydric or polyhydric alcohols, such as methanol, isooctyl alcohol, ethylene glycol, tridecyl alcohol, and cyclic aromatic alcohols, such as phenol, cresols, etc.; ketones, such as acetone, methyl ethyl ketone, methyl isobutyl ketone, cyclohexanone, etc.; and aliphatic polar solvents, such as dimethyl sulfoxide and dimethyl formamide. The preferred diluents are water and the lower molecular weight primary aliphatic alcohols, particularly methanol. Where water is used as the diluent, the reaction product can be recovered by simply evaporating the water from the reaction mixture at atmospheric or reduced pressures. Because of the salt-like characteristic of the reaction product, nonpolar liquids including $C_1$ to $C_8$ aliphatic and aromatic hydrocarbons, perhalocarbons and ethers are excellent precipitating agents. Among the suitable precipitating agents are benzene, diethyl ether and carbon tetrachloride. Carbon tetrachloride is preferred mainly for safety reasons.

Alternatively, the diluent is a nonsolvent liquid, such as diethyl ether, and the solid reaction product is recovered by filtration after mixing the two reactants. Since at least one of the starting materials is insoluble in solvents of this type, this is a less satisfactory method because the product may be contaminated with impurities and unreacted material unless it is further purified. Among the useful nonsolvents are lower molecular weight ethers, such as dioxan, diisopropyl and ethyl isopropyl ether.

Any inert diluent can be used provided it is present in a sufficient quantity to facilitate mixing the reactants during the reaction. For instance, about 2 to 20 volumes of diluent, e.g. methanol, can be separately admixed with each volume of hydrazine and nitroform and the diluted reactants may be added in any order to the reaction vessel with stirring. It will be noted that the color of the reaction mixture changes from a light yellow to a rich gold as the reaction proceeds.

The solid yellow crystalline product obtained by any of the foregoing processes is useful as a monopropellant and an explosive. It can also be mixed with about 10 to 40 vol. percent binder and solid metal fuels such as aluminum, beryllium, lithium, boron and other solid oxidizers to make chemically balanced rocket propellants. The following is a comparison of this compound with other known oxygen-containing oxidizers in chemically balanced formulas:

COMPARISON OF OXYGEN OXIDIZERS IN ALUMINIZED SYSTEMS

| Oxidizer | 30 Vol. Percent NPU [1] Binder | | | 45 Vol. Percent NPU [1] Binder | | |
|---|---|---|---|---|---|---|
| | ISP [2] | RBV-CM [3] | RBV-CV [4] | ISP [2] | RBV-CM [3] | RBV-CV [4] |
| $NH_2NH_2 \cdot HC(NO_2)_3$ | 278 | 1.06 | 1.07 | 278 | 1.06 | 1.05 |
| $NH_2NH_2 \cdot HClO_4$ | 270 | 1.03 | 1.05 | 274 | 1.03 | 1.04 |
| $C_2(NO_2)_6$ | 263 | 1.01 | 1.02 | 268 | 1.03 | 1.03 |
| $NH_4ClO_4$ | 263 | 1.0 | 1.02 | 268 | 1.02 | 1.03 |

[1] NPU=Nitropolyurethane.
[2] ISP=Specific impulse.
[3] RBV-CM=Relative boost velocity-constant mass.
[4] RBV-CV=Relative boost velocity-constant volume.

The data show that the hydrazine salt is an outstanding oxidizer in relation to other oxidizers in the optimum formulations.

Aside from the foregoing uses, hydrazine mononitroform may be used in situ as a convenient source of nitroform, a normally unstable chemical. Unlike other nitroformate salts, the hydrazine compound can be stored for long periods of time at ambient temperature. Moreover, the nitroform portion of the salt can be released by reacting it with an appropriate reagent. For example, trinitroethanol, itself a valuable intermediate in the synthesis of certain high energy propellants, may be prepared by reacting aqueous formaldehyde with a solution of hydrazine nitroform in water.

The following examples illustrate the invention:

EXAMPLE 1

Nitroform (0.31 g.) dissolved in 20 ml. of diethyl ether was added dropwise to a rapidly stirred suspension of 64 mg. of anhydrous hydrazine in 2 ml. of diethyl ether at 0° C. The mixture was then stirred for 15 minutes. Evaporation of the ether gave a yellow crystalline solid. The salt was quite pure. It can be recrystallized from methanol-carbon tetrachloride mixtures, if desired. The calculated nitrogen for hydrazine mononitroform is 38.3%. A nitrogen analysis showed it contained 38.7% nitrogen. The $\lambda$ maximum of the ultraviolet spectrum was 348 m$\mu$ and $\epsilon$ equaled $1.5 \times 10^{-4}$ L mole$^{-1}$ cm.$^{-1}$. The product has a density of 1.86 g./cc. (liquid displacement method) and was soluble in methanol, water and anhydrous hydrazine. Its autoignition was 5 seconds at 165° C. and showed no decomposition after 7 days at ambient temperature.

EXAMPLE 2

Anhydrous hydrazine (0.2 g.) in 2.0 ml. methanol was added to a rapidly stirred solution of nitroform (1.1 g.) in 10 ml. of methanol in a 50 ml. beaker over a period of a few seconds at ambient temperature and atmospheric pressure. The mixture was then stirred for a few minutes. A golden colored solution was obtained. The liquid reaction mixture was poured into a 500 ml. beaker containing a large excess (200 ml.) of rapidly stirred carbon tetrachloride at room temperature and the yellow precipitate that formed was filtered and washed with pure carbon tetrachloride. The product was dried in a vacuum desiccator for 24 hours at room temperature. It was analyzed and found to contain 38.4% nitrogen.

EXAMPLE 3

.454 g. of nitroform was dissolved in 1.0 ml. of water. To this solution was added dropwise 0.10 cc. of hydrazine hydrate dissolved in 1.0 cc. of water. Evaporation to dryness produced a yellow crystalline hydrazine mononitroform.

Resort may be had to various modifications and variations of the process without departing from the scope of the present claims. For instance, an inert gas, such as nitrogen, may be used as the atmosphere of the reaction or excesses of nitroform or hydrazine may be employed. Also pressure, e.g. 10 p.s.i.g., can be utilized especially when low boiling diluents are used. However, the process can be economically and easily carried out in an open glass vessel at room temperature and atmospheric pressure.

What is claimed is:

1. Process for preparing hydrazine mononitroform which comprises reacting hydrazine with nitroform in an equimolar proportion in an inert organic liquid diluent, precipitating the resulting formed hydrazine mononitroform from the diluent in a nonpolar organic liquid non-solvent for the hydrazine mononitroform, and recovering the precipitated hydrazine mononitroform.

2. Process for preparing hydrazine mononitroform which comprises reacting anhydrous hydrazine with nitroform in equimolar amounts in the presence of an inert organic solvent at 0° to 50° C. for a sufficient period of time to form hydrazine nitroform which is dissolved by said solvent, admixing the reaction mixture containing the formed hydrazine mononitroform with an excess of a nonpolar organic liquid which is a non-solvent for the hydrazine mononitroform to precipitate the hydrazine mononitroform and recovering the precipitate.

3. Process for preparing high purity hydrazine mononitroform which comprises admixing a methanol solution of anhydrous hydrazine with a methanol solution of nitroform, reacting the hydrazine with an equimolar proportion of the nitroform in the resulting reaction mixture, admixing with the resulting liquid reaction mixture containing hydrazine mononitroform a sufficient amount of a nonpolar organic liquid non-solvent to precipitate the mononitroform from the methanol solution, and recovering the thus precipitated hydrazine mononitroform.

4. Process for preparing high-purity hydrazine mononitroform which comprises, dissolving hydrazine mononitroform containing impurities in an inert organic liquid solvent to form a solution of the hydrazine mononitroform in the solvent, and precipitating the hydrazine mononitroform from said solution by adding to the solution a nonpolar organic liquid non-solvent hydrazine mononitroform salt, and recovering the thus precipitated hydrazine mononitroform of high purity.

5. High-purity hydrazine mononitroform of increased stability consisting of hydrazine mononitroform washed with and wet with carbon tetrachloride.

6. Process for preparing hydrazine mononitroform which comprises reacting anhydrous hydrazine with nitroform in equimolar amounts in the presence of methanol as solvent at 0° to 50° C. for a sufficient period of time to form hydrazine nitroform which is dissolved by said solvent, admixing the reaction mixture containing the formed hydrazine mononitroform with an excess of carbon tetrachloride which is a nonsolvent for the hydrazine mononitroform to precipitate the hydrazine mononitroform and recovering the precipitate.

7. In the process of preparing hydrazine mononitroform by reacting hydrazine with nitroform to form hydrazine mononitroform which contains impurities, the improvement which comprises washing the hydrazine nitroform salt with a nonpolar organic liquid which is a nonsolvent for the hydrazine nitroform salt.

8. In the improvement defined by claim 7, said nonpolar organic liquid being selected from the group consisting of $C_1$ to $C_8$ aliphatic and aromatic hydrocarbons, perhalocarbons, and ethers.

9. In a process for preparing hydrazine mononitroform which is formed by reacting hydrazine with nitroform to obtain hydrazine nitroform salt, the improvement which comprises dissolving and recrystallizing said salt in a mixture of an alcohol solvent for the salt and a nonpolar organic liquid which is a nonsolvent for said salt.

10. In the improvement defined in claim 9, the mixture of the alcohol and the nonpolar organic liquid being methanol and carbon tetrachloride.

References Cited

UNITED STATES PATENTS

| | | | |
|---|---|---|---|
| 2,615,920 | 10/1952 | Bahner | 260—583 |
| 2,786,078 | 3/1957 | Sawer | 260—583 |
| 2,930,683 | 3/1960 | Adelman | 52—0.5 |
| 2,966,403 | 12/1960 | Weil | 52—0.5 |
| 2,963,507 | 12/1960 | Rudner et al. | 260—583 |
| 3,140,317 | 7/1964 | Groves | 260—644 |
| 3,213,609 | 10/1965 | Johnston et al. | 149—36 X |
| 3,297,747 | 1/1967 | Thornton | 260—644 X |

OTHER REFERENCES

Weissberger: Technique of Organic Chemistry, vol. III, second edition (1956), Part I, Separation and Purification. Published by Interscience Publishers Inc., N.Y., pp. 475–479.

CARL D. QUARFORTH, *Primary Examiner.*

LEON D. ROSDOL, OSCAR R. VERTIZ, *Examiners.*

B. R. PADGETT, J. W. WHISLER, L. A. SEBASTIAN, *Assistant Examiners.*